United States Patent Office 2,934,526
Patented Apr. 26, 1960

2,934,526
POLYMERS OF A VINYLPHENYL BOROXOLE

Arthur K. Hoffmann, Stamford, and Walter M. Thomas, Noroton Heights, Conn., assignors to American Cyanamid Company, New York, N.Y., a corporation of Maine No Drawing. Application September 6, 1957
Serial No. 682,315

9 Claims. (Cl. 260—88.1)

This invention relates to the production of new materials having valuable and characteristic properties that make them especially suitable for use in industry, for example in molding, coating, laminating, impregnating, textile-treating and adhesive applications, as neutron absorbers, gelling agents, metal-ion sequestering agents, and for other purposes. More particularly the invention is concerned with a polymer, specifically a cross-linked polymer, of a vinylphenyl boroxole, which is an anhydride of a vinylphenyl boronic acid. A vinylphenyl boroxole may be repesented by the following general formula:

(I)
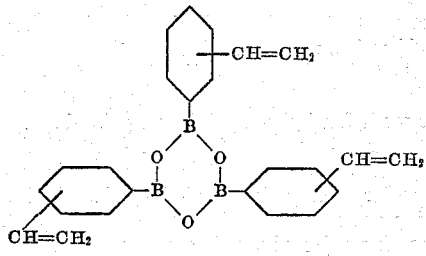

The term "a polymer" as used generically herein and in the appended claims with reference to a vinylphenyl boroxole includes within its meaning both homopolymers and copolymers of a vinylphenyl boroxole, for instance copolymers of a vinylphenyl boroxole with a compound which is different from the said boroxole, is copolymerizable therewith and which contains a single $CH_2=C<$ grouping or a plurality of $CH_2=C<$ groupings, e.g., styrene, dimethyl styrene, methyl acrylate, methyl methacrylate, ethyl methacrylate, vinyl acetate, acrylonitrile, acrylamide, diallyl phthalate, triallyl citrate, tetrallyl silane, etc. The scope of the invention also includes method features whereby new and useful synthetic compositions are produced.

Compounds embraced by Formula I include the o-, m- and p-vinylphenyl boroxoles, and the term "a vinylphenyl boroxole" as used generically herein and in the appended claims includes within its meaning both the pure or substantially pure isomers of vinylphenyl boroxole, as well as any two or all three of the aforementioned isomers in any proportions.

(The phenyl radical represented, for purpose of simplicity, by the symbol (II)

in Formula I also is frequently represented by the symbol (III)

in order to indicate the aromatic unsaturation; and, hence, the latter symbol could be substituted, if desired, for the symbol used for the phenyl radical in Formula I.)

The polymers, especially the copolymers, of this invention are characterized, in general, by the fact that they are capable of undergoing reversible cross-linking; that is, the normally cross-linked copolymers (by suitable treatment) can be converted into linear polymers; and the latter, in turn, can be cross-linked merely by heating. Furthermore, whereas most poly-(vinylphenyl) compounds, by which is meant specifically polystyrenes, have a softening point within the range of about 90° to 110° C., in marked contrast the homopolymeric vinylphenyl boroxoles of this invention do not soften below about 300° C.

It is one of the primary objects of the present invention to prepare a new class of polymers, including both homopolymers and copolymers, for use in industry.

Another object of the invention is to prepare polymers which are capable of undergoing reversible cross-linking.

Still another object of the invention is to prepare new boron-containing polymers.

Another object of the invention is to improve the usefulness of a vinylphenyl boroxole whereby its field of utility is enhanced.

Other objects of the invention will be apparent to those skilled in the art from the following more detailed description.

Vinylphenyl boroxoles are believed to be new chemical compounds. They are more fully described and are broadly and specifically claimed in the copending application of Arthur K. Hoffmann, Stephen J. Groszos and Walter M. Thomas, Serial No. 682,312, filed concurrently herewith. Brief descriptions of two different methods of preparation follow.

The o-, m- and p-vinylphenyl boroxoles (or mixtures of any two or all three of these isomers in any proportions) can be prepared by dehydrohalogenating, under anhydrous conditions and while admixed with a base, the corresponding alpha-X-ethylphenyl boroxole where X represents chlorine or bromine. The afforementioned boroxoles also can be made by dehydrating the corresponding vinylphenyl boronic acid until water no longer is evolved. This method is more fully described, and is broadly and specifically claimed, in the copending application of Stephen J. Groszos and Arthur K. Hoffmann, Serial No. 682,314, filed concurrently herewith.

The objects of the invention are accomplished, in general, by polymerizing a vinylphenyl boroxole alone or while admixed with one or more (e.g., two, three, five or any desired number) of other unsaturated substances which are copolymerizable therewith, examples of which have been given hereinbefore. The homopolymer or copolymer advantageously is produced, for instance, by polymerizing a vinylphenyl boroxole, or a mixture thereof with one or more other unsaturated materials, under anhydrous conditions and with the aid of a polymerization catalyst or catalysts.

Examples of monomers containing a $CH_2=C<$ grouping that can be copolymerized with a compound of the kind embraced by Formula I, which are different therefrom, and which can be polymerized either singly or with a plurality (two, three, four or any desired number) thereof, the latter often being desirable in order to improve the compatibility and copolymerization characteristics of the mixture of monomers and to obtain new and valuable copolymers having the particular properties desired for a particular service application, are such monomers as the unsaturated alcohol esters, more particularly the vinyl, isopropenyl, allyl, methallyl, crotyl, 1-chloroallyl, 2-chloroallyl, cinnamyl, 1-phenylallyl, butenyl, etc., esters of saturated and unsaturated, aliphatic and aromatic, monobasic and polybasic acids such, for instance, as acetic, propionic, butyric, valeric, caproic, acrylic and alpha-substituted acrylic (including alkacrylic, e.g., methacrylic, ethacrylic, propacrylic, etc., and arylacrylic, e.g., phenylacrylic, etc.), crotonic, oxalic, malonic, succinic, glutaric, adipic, pimelic, suberic, azelaic, sebacic, fumaric, citraconic, mesaconic, itaconic, acetylene dicarboxylic, aconitic, benzoic, phenylacetic, phthalic, terephthalic, benzoylphthalic, etc., acids; the saturated monohydric alcohol esters, e.g., the methyl, ethyl, propyl, isopropyl, butyl, sec.-butyl, amyl, etc., esters of unsaturated aliphatic monobasic and polybasic acids, illustrative examples of which appear above; vinyl cyclic compounds (including monovinyl aromatic hydrocarbons), e.g., styrene, o-, m- and p-chlorostyrenes, -bromostyrenes, -fluorostyrenes, -methylstyrenes, -ethylstyrenes, -cyanostyrenes, the various poly-substituted styrenes such, for example, as the various di-, tri- and tetra-chlorostyrenes, -bromostyrenes, -fluorostyrenes, -methylstyrenes, -ethylstyrenes, -cyanostyrenes, etc., vinylnaphthalenes, vinylcyclohexanes, vinylfuranes, vinylpyridines, vinyldibenzofuran, divinylbenzenes, trivinylbenzenes, allylbenzenes, diallylbenzenes, N-vinyl carbazole, the various allyl cyanostyrenes, the various alpha-substituted styrenes and alpha-substituted ring-substituted styrenes, e.g., alpha-methyl styrene, alpha-methyl-para-methyl styrene, etc.; unsaturated ethers, e.g., ethyl vinyl ether, diallyl ether, ethyl methallyl ether, etc.; unsaturated acids and anhydrides, e.g., acrylic and methacrylic acids, maleic anhydride, etc.; unsaturated amides, for instance N-allyl caprolactam, acrylamide, and N-substituted acrylamides, e.g., N-methylol acrylamide, N-allyl acrylamide, N-methyl acrylamide, N-phenyl acrylamide, etc.; unsaturated ketones, e.g., methyl vinyl ketone, methyl allyl ketone, etc.; methylene malonic esters, e.g., methylene methyl malonate, etc.; butadienes, e.g., 1,3-butadiene, 2-chlorobutadiene, etc.; unsaturated polyhydric alcohol (e.g., butenediol, etc.) esters of saturated and unsaturated, aliphatic and aromatic, monobasic and polybasic acids, illustrative examples of which appear above; unsaturated glycidyl esters such as glycidyl acrylate, glycidyl methacrylate, glycidyl itaconate, glycidyl allyl phthalate, etc.

Other examples of monomers that can be copolymerized with a vinylphenyl boroxole to produce our new copolymer compositions are the vinyl halides, more particularly vinyl fluoride, vinyl chloride, vinyl bromide and vinyl iodide, and the various vinylidene compounds, including the vinylidene halides, e.g., vinylidene chloride, vinylidene bromide, vinylidene fluoride and vinylidene iodide, other comonomers being added if needed in order to improve the compatibility and copolymerization characteristics of the mixed monomers.

Other and more specific examples of monomeric materials which can be mixed or blended with a vinylphenyl boroxole, and the resulting homogeneous or substantially homogeneous, polymerizable composition then polymerized, as hereinafter more fully described, to yield new and valuable copolymer compositions are the allyl compounds, especially those which have a boiling point of at least about 60° C. Of the monomeric materials which can be used the allyl esters form a large class, all of which are suitable. The reactive allyl compounds employed are preferably those which have a high boiling point such, for example, as diallyl maleate, diallyl fumarate, diallyl phthalate, diallyl succinate, etc. Other allyl compounds which are not necessarily high boiling also may be used.

More specific examples of allyl compounds that can be copolymerized with a vinylphenyl boroxole are one or another or a plurality of the following (or a mixture thereof with another comonomer): allyl alcohol, methallyl alcohol, allyl acetate, allyl methacrylate, diallyl carbonate, allyl lactate, allyl alpha-hydroxyisobutyrate, allyl trichlorosilane, allyl acrylate, diallyl malonate, diallyl oxalate, diallyl gluconate, diallyl methylgluconate, diallyl adipate, diallyl azelate, diallyl sebacate, diallyl tartronate, diallyl tartrate, diallyl mesaconate, diallyl citraconate, the diallyl ester of muconic acid, diallyl itaconate, diallyl chlorophthalate, diallyl dichlorosilane, the diallyl ester of endomethylene tetrahydrophthalic anhydride, triallyl tricarballylate, triallyl aconitate, triallyl cyanurate, triallyl phosphate, trimethallyl phosphate, tetrallyl silicate, hexallyl disiloxane, etc. Other examples of allyl compounds that may be employed are given in, for example, Kropa, U.S. Patent No. 2,510,503, dated June 6, 1950.

Among the comonomers which are preferred for use in carrying our invention into effect are the vinyl compounds, including the vinyl aromatic compounds, more particularly the vinyl aromatic hydrocarbons (e.g., styrene, the various dialkyl styrenes, etc.), and the vinyl aliphatic compounds, e.g., acrylonitrile, acrylamide, etc., and other compounds containing a $CH_2=C<$ grouping, e.g., the various substituted acrylonitriles (e.g., methacrylonitrile, ethacrylonitrile, phenylacrylonitrile, etc.), the various substituted acrylamides (e.g., methacrylamide, ethacrylamide, the various N-substituted acrylamides and alkacrylamides, for instance N-methylol acrylamide, N-monoalkyl and -dialkyl acrylamides and methacrylamides, e.g., N-monomethyl, -ethyl, -propyl, -butyl, etc. and N-dimethyl, -ethyl, -propyl, -butyl, etc., acrylamides and methacrylamides, N-monoaryl and -diaryl acrylamides and alkacrylamides, e.g., N-monophenyl and -diphenyl acrylamides and methacrylamides, etc.), vinyl esters, e.g., vinyl acetate, vinyl propionate, vinyl butyrate, vinyl isobutyrate, vinyl valerate, vinyl acrylate, vinyl methacrylate, etc., esters of an acrylic acid (including acrylic acid itself and the various alpha-substituted acrylic acids, e.g., methacrylic acid, ethacrylic acid, phenylacrylic acid, etc.), more particularly the alkyl esters of an acrylic acid, e.g., the methyl, ethyl, propyl, isopropyl, n-butyl, isobutyl, sec.-butyl, tert.-butyl, amyl, hexyl, heptyl, octyl, decyl, dodecyl, etc., esters of acrylic, methacrylic, ethacrylic, phenylacrylic, etc., acids, including the alkyl acrylates containing not more than four carbon atoms in the alkyl grouping, examples of which are given above, as well as other vinyl aromatic and vinyl aliphatic compounds, and other compounds containing a $CH_2=C<$ grouping.

An unsaturated alkyd resin or a plurality of such resins also may constitute the unsaturated material which is copolymerized with one or more vinylphenyl boroxoles to produce new and valuable copolymer compositions. Such resins are reaction products of a polyhydric alcohol and an unsaturated polycarboxylic acid or anhydride, and they contain a plurality of polymerizably reactive, alpha,beta-enal groups, that is, the grouping

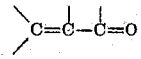

The unsaturated alkyd resins can be produced by various means, for example by the esterification of an unsaturated alpha,beta-polycarboxylic acid of the aliphatic series, more particularly an alpha,beta-unsaturated polycarboxylic acid, with a polyhydric alcohol, e.g., a glycol. The unsaturated alkyd resin employed as a co-reactant with a vinylphenyl boroxole is preferably one having an acid number not greater than 50, although in some cases resins having an acid number as high as 100 may be employed. The term "unsaturated alkyd resin" as used herein does not include within its meaning the conventional drying oil or drying oil acid-modified alkyd resins in the preparation of which an aromatic or a saturated aliphatic polycarboxylic acid or anhydride is used.

Illustrative examples of unsaturated alkyd resins that may be employed are those produced by reaction of the following ingredients: ethylene glycol and maleic anhydride; glycerine and maleic anhydride; diethylene glycol, maleic anhydride and phthalic anhydride; diethylene glycol and itaconic acid; ethylene glycol, maleic anhydride and succinic acid; ethylene glycol, maleic anhydride and tetrafluorosuccinic acid; ethylene glycol, itaconic acid and phthalic anhydride; diethylene glycol, maleic anhydride and tung oil acids; ethylene glycol, maleic anhydride, linseed oil acids and phthalic anhydride; diethylene glycol and maleic anhydride; ethylene glycol, maleic anhydride and stearic acid; diethylene glycol, maleic anhydride and decyl alcohol; ethylene glycol, maleic anhydride, octyl alcohol and acetic anhydride; diethylene glycol, fumaric acid, tetrahydroabietyl alcohol and linseed oil fatty acids; alpha-propylene glycol and maleic anhydride; diethylene glycol, fumaric acid and benzyl alcohol; diethylene glycol, fumaric acid and tetrahydroabietyl alcohol; ethylene glycol, furamic acid and omega-hydroxydecanoic acid; diethylene glycol, fumaric acid and linseed oil fatty acid monoglycerides; etc. Reference is made to the following patents for more detailed information regarding the ingredients, the preparation, and additional examples of modified and unmodified unsaturated alkyd resins that may be copolymerized with a vinylphenyl boroxole to yield new synthetic compositions having a wide variety of commercial applications: 2,409,633; 2,443,740; 2,443,741; 2,485,294; and 2,510,503.

Mixtures of any of the aforementioned polymerizable materials may be copolymerized with a vinylphenyl boroxole. For example, we may copolymerize a vinylphenyl boroxole with an unsaturated alkyd resin alone, e.g., diethylene glycol maleate, etc., or, also alone, a compound containing a $CH_2=C<$ grouping (which compound is different from a vinylphenyl boroxole), e.g., styrene, diallyl succinate, triallyl cyanurate, etc., or a mixture of such a resin and a compound containing a $CH_2=C<$ grouping. Mixtures of different unsaturated alkyl resins and of different compounds containing a $CH_2=C<$ grouping sometimes may be employed advantageously in making a copolymer thereof with a vinylphenyl boroxole.

Graft polymers of a vinylphenyl boroxole and a co-reactable substance are embraced by the term "copolymer" as used broadly herein and in the appended claims with reference to a vinylphenyl boroxole. The vinylphenyl boroxole may be grafted, for instance with the aid of ionizing radiation, to a polymer of a different polymerizable substance, e.g., polystyrenes, polyacrylonitriles or polymers of other monomers that contain a $CH_2=C<$ grouping, numerous examples of which have been given hereinbefore; or the base to which the graft is attached may be a polymer of a vinylphenyl boroxole to which is grafted a co-reactive unsaturated material such as styrene, acrylonitrile or other monomer containing a $CH_2=C<$ grouping, including any of those mentioned hereinbefore by way of example.

In the production of copolymers, the vinylphenyl boroxole generally constitutes at least about 3% by weight of the mixture of copolymerizable materials, e.g., from 5% or 10% to 90% or 95%, or even as high as 98% or 99% by weight of the aforesaid mixture. The smaller proportions are generally employed when it is desired to impart a specific property or characteristic to the copolymer. For example, in the case of the acrylonitrile copolymers, improved dye-receptivity is imparted to the copolymer and to fibers produced therefrom by copolymerizing ingredients including acrylonitrile and a vinylphenyl boroxole in proportions such that the initially-produced copolymer contains, by weight, from about 1% to about 10% by weight of vinylphenyl boroxole combined in the copolymer molecule.

Any suitable means may be employed in effecting polymerization of a vinylphenyl boroxole alone or admixed with one or more other unsaturated substances which are copolymerizable therewith. Although the vinylphenyl boroxoles are normally solids (i.e., solids at room temperature), they are capable of being polymerized with varying degrees of ease by, for example, a cationic initiator or catalyst (e.g., boron trifluoride-ethyl etherate), or by an anionic initiator or catalyst (e.g., a sodium-naphthalene complex, metallic sodium, etc.), or by a free-radical initiator or catalyst (e.g., benzoyl peroxide or other organic peroxy compound, or an azo catalyst such, for instance, as alpha,alpha'-azodiisobutyronitrile).

Additional examples of peroxy type of free-radical catalysts are the various organic peroxy catalysts, illustrative examples of which latter are: the dialkyl peroxides, e.g., dipropyl peroxide, dibutyl peroxide, dilauryl peroxide, dioleyl peroxide, distearyl peroxide, di-(tert.-butyl) peroxide and di-(tert.-amyl) peroxide; the alkyl hydrogen peroxides, e.g., tert.-butyl hydrogen peroxide (tert.-butyl hydroperoxide), tert.-amyl hydrogen peroxide (tert.-amyl hydroperoxide), etc.; symmetrical diacyl peroxides, for instance peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; fatty oil acid peroxides, e.g., coconut oil acid peroxides, etc.; unsymmetrical or mixed diacyl peroxides, e.g., acetyl benzoyl peroxide, propionyl benzoyl peroxide, etc.; terpene oxides, e.g., ascaridole, etc.; urea peroxide; the various percarboxylic acids; the various percarbonates, persulfates, perborates, etc.; and others that will be apparent to those skilled in the art from the foregoing examples.

Additional examples of azo type of free-radical catalysts include the following:

Dimethyl alpha,alpha'-azodiisobutyrate
Alpha,alpha'-azobis (alpha-methylbutyronitrile)
Alpha,alpha'-azobis (alpha-ethylbutyronitrile)
Alpha,alpha'-azobis (alpha,gamma-dimethylvaleronitrile)
Alpha,alpha'-azobis (alpha-methylvaleronitrile)
Alpha,alpha'-azobis (alpha-methylcapronitrile)
Alpha,alpha'-azobis (alpha-n-butylcapronitrile)
Alpha,alpha'-azobis (alpha-isobutyl-gamma-methylvaleronitrile)
Alpha, alpha'-azobis (alpha-isopropyl-beta-methylbutyronitrile)
Alpha,alpha'-azobis (alpha,beta-dimethylbutyronitrile)
Alpha,alpha'-azobis (alpha,gamma-dimethylcapronitrile)
1,1'-azodicyclopentanecarbonitrile Reference is made to Hunt U.S. Patent No. 2,471,959, dated May 31, 1949, for additional examples and for a generic description of compounds of this class.

The chosen free-radical catalyst should be soluble in a component or components of the reaction mass, e.g., the anhydrous solvent or diluent employed or in the monomer chosen for copolymerization with the vinylphenyl boroxole.

In addition to free-radical catalysts of the above types or kinds, ionizing radiations, ultraviolet light, etc., may also be used to initiate polymerization.

Additional examples of ionic catalysts that can be used are p-toluene sulfonic acid, sulfuric acid, phosphoric acid, aluminum chloride, stannic chloride, titanium tetrachloride, boron trifluoride and other Lewis-type catalysts, more particularly Friedel-Crafts catalysts; and the various anionic catalysts, e.g., metallic potassium, a potassium-naphthalene complex, amylsodium, amylpotassium, etc.

The monomeric vinylphenyl boroxole or mixture of copolymerizable ingredients can be polymerized in anhydrous heterogeneous systems or in anhydrous solutions to yield a homopolymer or a copolymer. Various inert organic solvents or diluents also may be employed, the choice depending upon the particular comonomer and catalyst used and among which may be mentioned: benzene, toluene, xylene, dioxane, ethers (e.g., dibutyl ether), esters (e.g., butyl acetate), chlorobenzene, chloroform, carbon tetrachloride, methylene chloride, ethylene dichloride, ketones (e.g., methyl ethyl ketone), tertiary alcohols, for instance tertiary-butyl alcohol, tertiary-amyl alcohol, tertiary-hexyl alcohol, as well as others. When the reaction is effected in anhydrous solution state, a temperature at or approaching the boiling temperature of the solution may be used if desired. The homopolymer or copolymer is then separated from the anhydrous liquid medium (solvent or diluent) in which polymerization was effected by any suitable means, e.g., by filtration, centrifuging, solvent extraction, evaporation of the solvent or diluent, etc.

The polymerization can be effected continuously, semi-continuously or by a batch operation. Bulk or mass polymerization technique can be used; or polymerization can be effected in an anhydrous solvent which is capable of dissolving the polymerizable substance and in which the latter is preferably inert; or in an anhydrous liquid medium in which the polymerizable substance is soluble but the homopolymer or copolymer is insoluble. The polymerization can be effected at atmospheric or at superatmospheric pressures, as desired or as conditions may require.

As indicated hereinbefore a catalyst of catalytic influence is required in order to initiate the polymerization or if polymerization is to be effected in a reasonable or practical period of time. The concentration of catalyst employed varies considerably. Thus, depending upon the particular catalyst used and the kind and amount (if any) of copolymerizable substance that is being copolymerized with the vinylphenyl boroxole, it may range from, for example, about 0.5 part or 1 part by weight of catalyst per thousand parts by weight of the polymerizable substance to a molar ratio of catalyst/polymerizable substance equal to or greater than 1.

The temperature of polymerization of the polymerizable substance of composition, at atmospheric of superatmospheric pressure, and under a catalytic influence such as that provided by an added polymerization initiator, can be varied over a wide range up to and including or slightly above the boiling point (at atmospheric pressure) of the mass (or of the lowest boiling component thereof), but should be below the decomposition temperature of the monomeric material or materials (i.e., the polymerizable composition). In most cases the polymerization temperature will be within the range of 15° C. to 150° C., more particularly within the range of 20°–30° C. (ordinary room temperature) to about 130° C., depending upon the particular polymerizable composition being polymerized, the particular catalyst used, the rapidity of polymerization wanted, and other influencing factors. With certain ionic catalysts, e.g., gaseous $BF_3$, a boron trifluoride-ethyl ether complex, concentrated sulfuric acid, anhydrous aluminum chloride, etc., a substantially lower polymerization temperature often advantageously may be used, e.g., temperatures ranging between −80° C. and 0° C. or +10° C. At the lower temperatures below the solidification point of the monomeric vinylphenyl boroxole or of the mixture thereof with one or more other polymerizable substances, polymerization is usually effected while the polymerizable composition is dissolved or dispersed in an anhydrous solvent or dispersion medium which is liquid at the polymerization temperature. The polymeric material is then separated from the anhydrous liquid medium in which polymerization was effected by any suitable means, for example by techniques such as those mentioned hereinbefore for purpose of illustration.

In order that those skilled in the art may better understand how the present invention can be carried into effect, the following examples are given by way of illustration and not by way of limitation. All parts and percentages are by weight unless otherwise stated.

*Example 1*

Five (5) grams (0.013 mole) of p-vinylphenyl boroxole is dissolved in 45 g. of anhydrous chloroform and the solution is cooled to −60° C. To the cold solution is added 1 g. of boron trifluoride etherate, which is equivalent to 0.007 mole of boron trifluoride. The solution is allowed to warm to room temperature (about 20°–30° C.), but no polymerization is visually apparent after standing for several hours. An additional 1 g. of boron trifluoride etherate is then added, thereby increasing the total amount of boron trifluoride employed to 0.014 mole. Gelation then occurs within one hour.

The gel comprised of homopolymeric p-vinylphenyl boroxole is broken up in the presence of excess chloroform, filtered, and washed with additional quantities of chloroform. The solid polymeric material is finally dried by vacuum evaporation.

The melting point of the dried homopolymer is greater than 300° C. It is insoluble in dimethylformamide, tetrahydrofurane, diethyl ether, acetone, nitrobenzene, nitromethane, chlorobenzene, chloroform, toluene, methyl ethyl ketone, ethyl acetate, butyl acetate and amyl acetate, pyridine, dimethyl sulfoxide and water. However, it is readily soluble in aqueous pyridine or in aqueous alkali solutions, e.g., an aqueous solution of sodium hydroxide. Acidification of the alkaline solution precipitates a white polymer showing none of the solubility characteristics of the poly-(p-vinylphenyl)boroxole. The hydrolyzed polyboroxole is soluble in a wide variety of moist solvents such as ketones, acetates and ethers, but is insoluble in water, chloroform and benzene. The structure of this polymer is undoubtedly that of poly-(p-vinylphenyl)boronic acid. It does not melt below 300° C. and appears to be stable at this temperature.

*Example 2*

Essentially the same procedure is followed as described under Example 1 with the exception that 40 g. of anhydrous methylene chloride is used instead of 45 g. of anhydrous chloroform; and 1 g. instead of 2 g. of boron trifluoride etherate. Similar results are obtained.

*Example 3*

Five (5) g. of p-vinylphenyl boroxole is dissolved in 50 ml. of methylene chloride. The solution is maintained at 20° C. A methylene chloride solution containing 1.7 g. of anhydrous aluminum chloride is added and the mixture is allowed to remain at 20° C. for 2 hours. At the end of this time, the gel resulting from the polymerization reaction is broken up, filtered, washed with excess methylene chloride and dried. The polymer so obtained is a hard, brittle solid; M.P. >300° C.

*Example 4*

Same as in Example 3 with the exception that 2.5 g. of anhydrous stannic chloride is used instead of 1.7 g. of anhydrous aluminum chloride. Similar results are obtained.

*Example 5*

Five (5) g. of o-vinylphenyl boroxole is dissolved in 50 ml. of methylene chloride. To this solution maintained at 20° C. is added 0.9 g. of boron trifluoride as boron trifluoride-diethyl etherate. After 2 hours at this temperature the gel that forms is broken up, filtered, and washed with methylene chloride. After solvent evaporation in vacuo, the polymer is powdered. Although insoluble in anhydrous organic solvents, the polymer is completely soluble in aqueous alkali. The polymer has M.P. >300° C.

*Example 6*

Same as in Example 5 with the exception that p-vinylphenyl boroxole is employed. Similar results are obtained.

The following examples illustrate the use of a free-radical catalyst in the homopolymerization of a vinylphenyl boroxole.

*Example 7*

Three (3) g. of p-vinylphenyl boroxole is dissolved in 30 g. of toluene to which 600 mg. of alpha,alpha'-diisobutyronitrile is added. The solution is degassed and heated for 1 hour at 100° C. The gel which forms is broken, washed with excess toluene, filtered and dried. The resulting polymer does not melt below 300° C. Its solubility and insolubility characteristics are the same as those of the homopolymers of the preceding examples. It can be hydrolyzed to a linear polymer by aqueous sodium hydroxide, which polymer is soluble in aqueous solvents such as aqueous t-butanol and aqueous butyl acetate.

Example 8

This example is somewhat similar to Example 7, but involves the use of a lower polymerization temperature and a longer period of polymerization.

Ten (10) g. of p-vinylphenyl boroxole is dissolved in 100 ml. of toluene. The solution is maintained under a nitrogen atmosphere at 80° C. for 4 hours after the addition of 100 mg. of alpha,alpha'-azodiisobutyronitrile. The solution sets to a gel which, after cooling, is broken up, filtered, and washed with additional toluene. The toluene is removed from the gel by vacuum evaporation and the remaining white solid, M.P. >300° C., is powdered. The polymer is highly cross-linked and insoluble in organic solvents such as dimethylformamide, tetrahydrofurane, ether, acetone, nitromethane, nitrobenzene, chlorobenzene, chloroform, methylene chloride, benzene, methyl ethyl ketone, esters, pyridine, water, etc. The polymer is, however, soluble in aqueous alkali, due to hydrolysis of the boroxole units by which the polymer is cross-linked. The hydrolyzed polymer is linear, and soluble in aqueous alkali in its salt form. The isolated polymer is obtained in a theoretical yield.

Example 9

Same as in Example 8 with the exception that o-vinylphenyl boroxole is employed. Similar results are obtained.

Example 10

Ten (10) g. of p-vinylphenyl boroxole is dissolved in 100 ml. of xylene and to the solution is added 100 mg. of di-tert.-butyl peroxide. The solution is heated to 130° C. for 1 hours. At the end of this time, the gel is cooled, broken up and filtered. The crushed gel is washed with a small quantity of xylene, and the solvent removed by vacuum evaporation. The properties of the polymer obtained in this fashion are identical to those obtained in Example 8, with the exception that a small portion of the polymer is insoluble in aqueous sodium hydroxide, but is swollen to a gel. This insoluble polymer is, therefore, cross-linked by carbon-carbon bonds which cannot be hydrolyzed by aqueous alkali. The total polymer (soluble and insoluble fractions) is formed in theoretical yield.

Instead of o- or p-vinylphenyl boroxole in the foregoing examples, one can use m-vinylphenyl boroxole, or a mixture of any two or all three of the isomers of a vinylphenyl boroxole in any proportions.

The above-mentioned homopolymeric vinylphenyl boroxoles are particularly valuable in high temperature-resisting coating, adhesive, impregnating and laminating applications, and wherein they can be applied in the form of dispersions. They are especially useful for purposes where it is desired subsequently to remove the material, which latter can be done with the polymers, specifically the homopolymers, of this invention by treatment with a dilute aqueous solution, e.g., a dilute solution of sodium hydroxide.

The following examples illustrate the preparation of copolymers of the invention.

Example 11

493 mg. ($4.75 \times 10^{-3}$ mole) of styrene and 654 mg. ($1.57 \times 10^{-3}$ mole) of p-vinylphenyl boroxole are dissolved in 5 g. of anhydrous toluene containing 0.0013 g. ($7.9 \times 10^{-5}$ moles) of alpha,alpha'-azodiisobutyronitrile. After 6 hours at 70° C., the gelatinous reaction mass is broken up, washed with toluene and dried. The dried copolymer of styrene and p-vinylphenyl boroxole is insoluble in organic solvents and has a melting point of 280° C. with decomposition. It is suitable for use, for example, as a molding resin with fire-retardant properties; and as a modifier for coating and adhesive resins to increase their thermal resistance.

Example 12

Six and three-fourths (6.75) g., i.e. $1.73 \times 10^{-2}$ mole, of p-vinylphenyl boroxole and 33.9 g. (0.64 mole) of acrylonitrile are placed into a 3-necked flask fitted with a nitrogen inlet, stirrer, and reflux condenser. Seventy-five (75) ml. of anhydrous benzene are added and the stirrer started. To the solution is added 300 mg. of alpha,alpha'-azodiisobutyronitrile, and the resulting solution is heated to reflux for 4 hours. At the end of this time the reaction mass is cooled, and the precipitated copolymer of acrylonitrile and p-vinylphenyl boroxole is removed by filtration and dried in an oven at 100° C. The dried copolymer is powdered and dissolved in 0.5 N aqueous sodium hydroxide to hydrolyze the cross-linking boroxole units. The alkaline copolymer solution is neutralized with hydrochloric acid and the precipitated linear copolymer is filtered and dried at 100° C. in vacuo. Both the hydrolyzed and unhydrolyzed copolymers have M.P. >300° C.

The hydrolyzed acrylonitrile-p-vinylphenyl boroxole copolymer of this example can be wet-spun or dry-spun into fibers by any of the procedures known to the art, yielding fibers that have improved dye-receptivity as compared with fibers made from homopolymeric acrylonitrile or many of the known fiber-forming (fiber-formable) copolymers of acrylonitrile.

Similar results are obtained when o- or m-vinylphenyl boroxole is substituted for p-vinylphenyl boroxole in the above example or when one uses a mixture of any of the isomers of vinylphenyl boroxole in any proportions.

Example 13

| | Parts |
|---|---|
| p-Vinylphenyl boroxole | 40.0 |
| Ethyl acrylate | 60.0 |
| n-Propyl acetate (anhydrous) | 100.0 |
| Benzoyl peroxide | 1.0 | are heated together under reflux at the boiling temperature of the mass for 5 hours. The resulting mass containing a copolymer of ethyl acrylate and the aforementioned vinylphenyl boroxole is cooled, and precipitated with methanol. The copolymer of this example is suitable for use as a component of coating compositions.

Instead of ethyl acrylate other comonomers, more particularly other esters of acrylic acid, e.g., methyl acrylate, propyl acrylate, isopropyl acrylate, n-butyl acrylate, isobutyl acrylate, sec.-butyl acrylate, tert.-butyl acrylate, amyl acrylate, hexyl acrylate, propenyl acrylate, cyclohexyl acrylate, phenyl acrylate, benzyl acrylate, etc., can be substituted in the above formulation thereby to obtain copolymer compositions of varying properties. As with ethyl acrylate, so too with such other comonomers the proportions of components can be varied as desired or as conditions may require, e.g., from 3 to 97 (or higher) molar percent of the p-vinylphenyl boroxole to from 97 to 3 (or lower) molar percent of the other comonomer.

Example 14

Styrene (9.00 g.), p-vinylphenyl boroxole (1.0 g.) and anhydrous chlorobenzene (50 g.) are heated to 80° C., and 0.01 g. alpha,alpha'-azodiisobutyronitrile dissolved in 1.0 g. anhydrous chlorobenzene is added. The mixture is heated for 4 hours at 80° C. The solution is then poured into 100 ml. of cold methanol, and the resulting copolymer of styrene and p-vinylphenyl boroxole is removed by filtration, washed and dried. The dried copolymer, alone or with a dye, pigment, opacifier, filler, plasticizer, lubricant, or other effect agent, may be molded under heat and pressure, e.g., at 140° C. to 170° C.

and under a pressure of 3000 to 5000 pounds per square inch or higher.

The copolymer of this example, dissolved or dispersed in, for example, methyl ethyl ketone, may be used as a coating composition or as a component of such compositions. For instance, it may be applied to a surface of glass, metal, wood or other material to be protectively finished, and the coated article then heated for from 1 to 3 hours at a temperature of the order of 100° C. to 120° C. to evaporate the solvent and to solidify the coating thereon.

*Example 15*

| | Parts |
|---|---|
| p-Vinylphenyl boroxole | 10.0 |
| Vinylidene chloride | 290.0 |
| Alpha,alpha'-azodiisobutyronitrile | 3.0 | are mixed and heated together in a closed vessel for 24 hours at 40° C., and for another 24 hours at 60° C., yielding a solid copolymer of vinylidene chloride and the said vinylphenyl boroxole. This copolymer can be hot drawn to obtain monofilaments, rods, bars, tubes, etc., having a wide variety of commercial uses.

*Example 16*

One hundred (100) g. of anhydrous ethyl acetate is used as a solvent for 1.0 g. of methyl methacrylate, 9.0 g. of p-vinylphenyl boroxole and 0.05 g. of benzoyl peroxide. The mixture is stirred in an oxygen-free atmosphere for 6 hours at 65° C. The copolymer of methyl methacrylate and p-vinylphenyl boroxole that forms is recovered by pouring the reaction mass into a large excess of rapidly stirred methanol, separating the precipitated copolymer by filtration, washing with methanol and drying at 40° C. The dried copolymer can be used in molding, coating, adhesive and other compositions.

*Example 17*

| | Parts |
|---|---|
| p-Vinylphenyl boroxole | 50.0 |
| Vinyl acetate | 50.0 |
| Methyl ethyl ketone | 100.0 |
| Alpha,alpha'-azodiisobutyronitrile | 0.1 |

The homogeneous solution of the above comonomers is refluxed for 7 hours. At the end of this time the solvent and unreacted vinyl acetate are removed by vacuum evaporation. A solid copolymeric mass is obtained.

*Example 18*

Same as in Example 17 with the exception that 25 parts methyl acrylate and 25 parts ethyl acrylate are substituted for 50 parts of vinyl acetate. Similar results are obtained.

*Example 19*

Same as in Example 18 with the exception that the polymerization is initiated by 250 kv.-peak X-rays from a General Electric Maxitron tube operated at 30 milliamperes. After 6 hours' irradiation, a solid copolymer is obtained.

*Example 20*

A mixture of 10 g. p-vinylphenyl boroxole, 10 g. p-cyanostyrene, 50 g. xylene and 0.20 g. di-tert.-butyl peroxide is heated to 130° C. over a period of 2 hours. The mixture is kept at this temperature for a total of 2 more hours. A copolymer of p-vinylphenyl boroxole and p-cyanostyrene precipitates from the xylene as it forms. The copolymer is removed by filtration and washed with hot xylene. The dried copolymer is insoluble in common organic liquids, but swells in aqueous alkali.

*Example 21*

A spinning solution is prepared by dissolving 50 parts of the hydrolyzed acrylonitrile copolymer of Example 12 in an amount of a concentrated aqueous solution of sodium thiocyanate (about 49% NaSCN in water) such that the concentration of copolymer in this solution is about 10%. The resulting solution is filtered, placed under vacuum and allowed to deaerate for 3 days.

The spinning solution thereby obtained is spun into a fiber by extruding it through a spinnerette having 45 holes, each 75 microns in diameter, into a coagulating bath comprising water maintained at a temperature of about 0° C. The freshly spun fiber in gel state is continuously passed over a pair of converging wash rolls while it is advancing in a helical path. The fiber is rinsed with water on the rolls to remove excess thiocynate. The washed fiber is stretched 700%, for example by passing it through a bath of hot water maintained at a temperature of about 99.5° C., followed by drying on converging drying rolls while it is moving in a helical path toward the take-off end as is more fully described in Cresswell et al. U.S. Patent No. 2,558,733.

The dried fiber has better dye-receptivity than a fiber which has been similarly prepared from homopolymeric acrylonitrile.

*Example 22*

| | Parts |
|---|---|
| o-Vinylphenyl boroxole | 5.0 |
| Methyl acrylate | 5.0 |
| Methyl methacrylate | 45.0 |
| Alpha,alpha'-azodiisobutyronitrile | 3.5 | are mixed together and charged to a heavy-walled glass tube, which thereafter is sealed under vacuum. Copolymerization is effected by heating the sealed tube in an 80° C. water bath for 60 hours and then in an oil bath as follows: 24 hours each at 100° C., 120° C., 135° C. and 150° C. The resulting copolymer can be molded under heat and pressure to yield a wide variety of molded articles for domestic and industrial uses.

*Example 23*

Thirty (30) parts of ethylene glycol fumarate sebacate (4:3:1 molar ratio) are mixed with 5 parts of p-vinylphenyl boroxole and 5 parts of styrene. To 12 parts of the resulting mixture are added 8 parts of wood flour filler and 2 parts of benzoyl peroxide containing 50% inactive filler (triphenyl phosphate). The resulting mixture is compacted by passage through cold rolls and disintegrated, and this composition then placed in a disk mold preheated to 140 C. and left there under a pressure of about 5000 pounds per square inch for about 20 minutes. The resulting molding is hard and well-cured.

*Example 24*

A uniform mixture of 25 parts of ethylene glycol fumarate sebacate (4:3:1 molar ratio), 0.5 part of p-vinylphenyl boroxole and 9.5 parts of styrene containing 0.4 part of benzoyl peroxide is spread evenly between five plies of ECC-11-112 Fiberglas cloth and the combination is held under slight pressure in a Carver press for about 40 minutes at about 150° C. The resinous copolymer component of the impregnated Fiberglas cloth becomes hard and the panel stiff.

*Example 25*

The resin mixture of Example 24 is spread evenly between six plies of No. 720 paper, and the combination is subjected to the same curing conditions as the Fiberglas laminate of Example 24. The resulting panel is stiff, and the paper laminate is well-cured.

*Example 26*

Sixty-seven (67) parts of diethylene glycol fumarate sebacate (6:5:1 molar ratio), 5.0 parts of o-vinylphenyl boroxole, 28 parts of diallyl phthalate, 7 parts of paraformaldehyde and 0.5 part of benzoyl peroxide containing 50% inactive filler (triphenyl phosphate) are thoroughly mixed together in a suitable vessel and then heated at 100° C. A vigorous reaction occurs, accompanied by evolution of gas. As the mass polymerizes and sets, it undergoes about a two-fold expansion and the cured mass is porous.

It will be understood, of course, by those skilled in the art that our invention is not limited to the specific ingredients named in the above illustrative examples nor to the particular proportions and methods of polymerization and copolymerization mentioned therein. For example, in place of the particular isomer of vinylphenyl boroxole specified in the individual example we may use any other isomer of said boroxole or mixtures thereof in any proportions. Also, in place of all or part of the particular co-reactant named in the individual example, one can use other compounds containing a $CH_2=C<$ grouping and/or an unsaturated alkyd resin, numerous examples of which have been given hereinbefore.

The polymerization products (polymers and copolymers) of this invention have a wide variety of applications, examples of which have been given hereinbefore. The compositions of the invention may be used with or without a filler or other additive, many examples of which latter also have previously been given. Among the fillers that can be employed are alpha-cellulose pulp, asbestos fibers, cotton flock, chopped cloth cuttings, glass fibers, wood flour, antimony oxide, titanium dioxide, sand, clay, mica dust, diatomaceous earth, etc.

The polymerizable (including incompletely polymerized) compositions used in producing the polymers of our invention also can be used in the production of moldings; as sizing agents; as adhesives, for instance as binders for paper, glass, wood, rubber, etc., or in the production of optical devices containing a plurality of elements, examples of which are compound lenses, compound prisms, Nicol prisms, etc.; in the treatment of paper or paper stock, textile fibers or fabrics, leather, etc.; and for various other purposes including those mentioned in some of the specific examples, and in the portion of this specification prior to the examples. The polymerizable compositions are then polymerized in situ.

We claim:
1. A polymer of a vinylphenyl boroxole, said boroxole being represented by the general formula

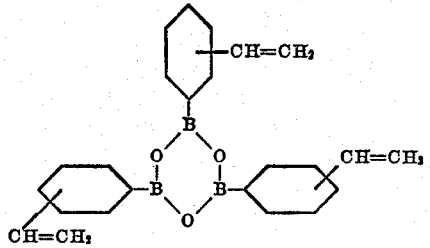

2. A cross-linked polymer of a vinylphenyl boroxole, said boroxole being represented by the general formula given in claim 1.

3. A homopolymer of a vinylphenyl boroxole, said boroxole being represented by the general formula given in claim 1.

4. Homopolymeric p-vinylphenyl boroxole, said boroxole in monomeric form having the formula

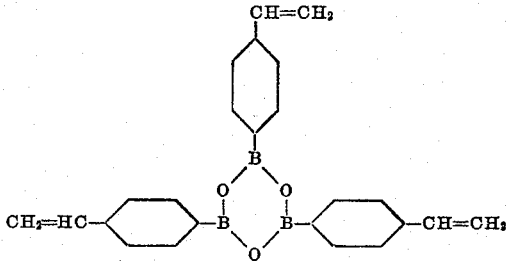

5. Cross-linked, benzene-insoluble, homopolymeric p-vinylphenyl boroxole, said boroxole in monomeric form having the formula

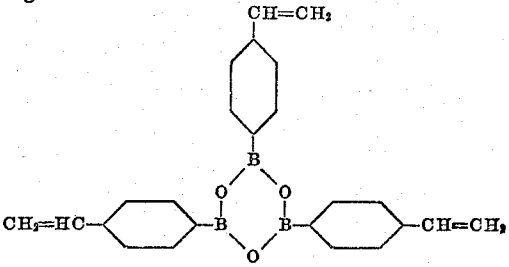

6. A composition comprising a copolymer of copolymerizable ingredients including (1) a vinylphenyl boroxole represented by the general formula given in claim 1 and (2) a compound which is different from the boroxole of (1), which is copolymerizable therewith and which contains a $CH_2=C<$ grouping.

7. A composition comprising a copolymer of copolymerizable ingredients including (1) a vinylphenyl boroxole represented by the general formula given in claim 1 and (2) a vinyl aromatic compound.

8. A composition comprising a copolymer of copolymerizable ingredients including (1) a vinylphenyl boroxole represented by the general formula given in claim 1 and (2) styrene.

9. The method of preparing a new synthetic material which comprises polymerizing a vinylphenyl boroxole under anhydrous conditions and with the aid of a catalyst selected from the class consisting of free-radical polymerization catalysts and ionic polymerization catalysts, said boroxole being represented by the general formula given in claim 1.

No references cited.

UNITED STATES PATENT OFFICE
CERTIFICATE OF CORRECTION

Patent No. 2,934,526                  April 26, 1960

Arthur K. Hoffmann et al.

It is hereby certified that error appears in the printed specification of the above numbered patent requiring correction and that the said Letters Patent should read as corrected below.

Column 2, line 40, for "afforementioned" read -- aforementioned --; column 5, line 30, for "alkyl" read -- alkyd --; column 6, line 55, for "Friedel-Crafts" read -- Friedel-Craft --; column 7, line 15, for "catalyst of" read -- catalyst or --; line 28, for "of", both occurrences, read -- or --; lines 42 and 43, for "inffuencing" read -- influencing --; column 9, line 39, for "hours" read -- hour --; column 12, line 47, for "140 C." read -- 140° C. --.

Signed and sealed this 8th day of November 1960.

(SEAL)
Attest:

KARL H. AXLINE                          ROBERT C. WATSON
Attesting Officer                       Commissioner of Patents